US012484457B2

(12) United States Patent
Young et al.

(10) Patent No.: US 12,484,457 B2
(45) Date of Patent: Nov. 25, 2025

(54) DIFFERENTIALLY PROGRAMMABLE MAGNETIC TUNNEL JUNCTION DEVICE AND SYSTEM INCLUDING SAME

(71) Applicant: Intel Corporation, Santa Clara, CA (US)

(72) Inventors: Ian Alexander Young, Olympia, WA (US); Dmitri Evgenievich Nikonov, Beaverton, OR (US); Chia-Ching Lin, Portland, OR (US); Tanay A. Gosavi, Portland, OR (US); Ashish Verma Penumatcha, Beaverton, OR (US); Kaan Oguz, Portland, OR (US); Punyashloka Debashis, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 935 days.

(21) Appl. No.: 17/465,752

(22) Filed: Sep. 2, 2021

(65) Prior Publication Data
US 2023/0065198 A1 Mar. 2, 2023

(51) Int. Cl.
H10N 52/80 (2023.01)
G06N 3/063 (2023.01)
G11C 11/16 (2006.01)
G11C 11/18 (2006.01)
H01F 10/32 (2006.01)
H10B 61/00 (2023.01)
H10N 50/80 (2023.01)
H10N 50/85 (2023.01)
H10N 52/00 (2023.01)

(52) U.S. Cl.
CPC ........... *H10N 52/80* (2023.02); *G11C 11/161* (2013.01); *G11C 11/1673* (2013.01);
(Continued)

(58) Field of Classification Search
None
See application file for complete search history.

(56) References Cited

U.S. PATENT DOCUMENTS 8,692,342 B2 * 4/2014 Oh .................. H10N 50/10
257/E27.008
8,823,118 B2 * 9/2014 Horng ............... H10N 50/85
257/E29.323

(Continued)

OTHER PUBLICATIONS

Manipatrunil, Sasikanth et al., "Scalable Energy-Efficient Magnetoelectric Spin-Orbit Logic," Nature, Springer Nature Limited (2018) (9 pages).

*Primary Examiner* — Nishath Yasmeen
(74) *Attorney, Agent, or Firm* — Alliance IP, LLC

(57) ABSTRACT

A memory device, an integrated circuit component including an array of the memory devices, and an integrated device assembly including the integrated circuit component. The memory devices includes a first electrode; a second electrode including an antiferromagnetic (AFM) material; and a memory stack including: a first layer adjacent the second electrode and including a multilayer stack of adjacent layers comprising ferromagnetic materials; a second layer adjacent the first layer; and a third layer adjacent the second layer at one side thereof, and adjacent the first electrode at another side thereof, the second layer between the first layer and the third layer, the third layer including a ferromagnetic material. The memory device may correspond to a magnetic tunnel junction (MTJ) magnetic random access memory bit cell, and the memory stack may correspond to a MTJ device.

23 Claims, 10 Drawing Sheets

(52) U.S. Cl.
CPC .......... *G11C 11/18* (2013.01); *H01F 10/3254* (2013.01); *H01F 10/3272* (2013.01); *H01F 10/329* (2013.01); *H10B 61/22* (2023.02); *H10N 50/80* (2023.02); *H10N 50/85* (2023.02); *H10N 52/00* (2023.02); *G06N 3/063* (2013.01)

(56) References Cited

U.S. PATENT DOCUMENTS

| | | | |
|---|---|---|---|
| 10,062,731 B2 | 8/2018 | Manipatruni et al. | |
| 10,600,465 B1* | 3/2020 | Araki | H10B 61/20 |
| 10,957,844 B2 | 3/2021 | Chawla et al. | |
| 11,038,099 B2 | 6/2021 | Manipatruni et al. | |
| 2009/0079018 A1* | 3/2009 | Nagase | H10N 50/85 |
| | | | 257/E29.323 |
| 2015/0076485 A1* | 3/2015 | Sandhu | G11C 11/161 |
| | | | 257/43 |
| 2015/0129996 A1* | 5/2015 | Tang | H10N 50/01 |
| | | | 257/427 |
| 2019/0207091 A1* | 7/2019 | Kardasz | H01F 10/3286 |
| 2019/0325932 A1 | 10/2019 | Manipatruni et al. | |
| 2019/0386662 A1 | 12/2019 | Lin et al. | |
| 2020/0006625 A1* | 1/2020 | Oguz | H01F 10/329 |
| 2020/0006627 A1* | 1/2020 | Manipatruni | H10N 50/80 |
| 2020/0066968 A1* | 2/2020 | Park | H01F 10/3254 |
| 2021/0367143 A1* | 11/2021 | Lee | H01F 10/3254 |

* cited by examiner

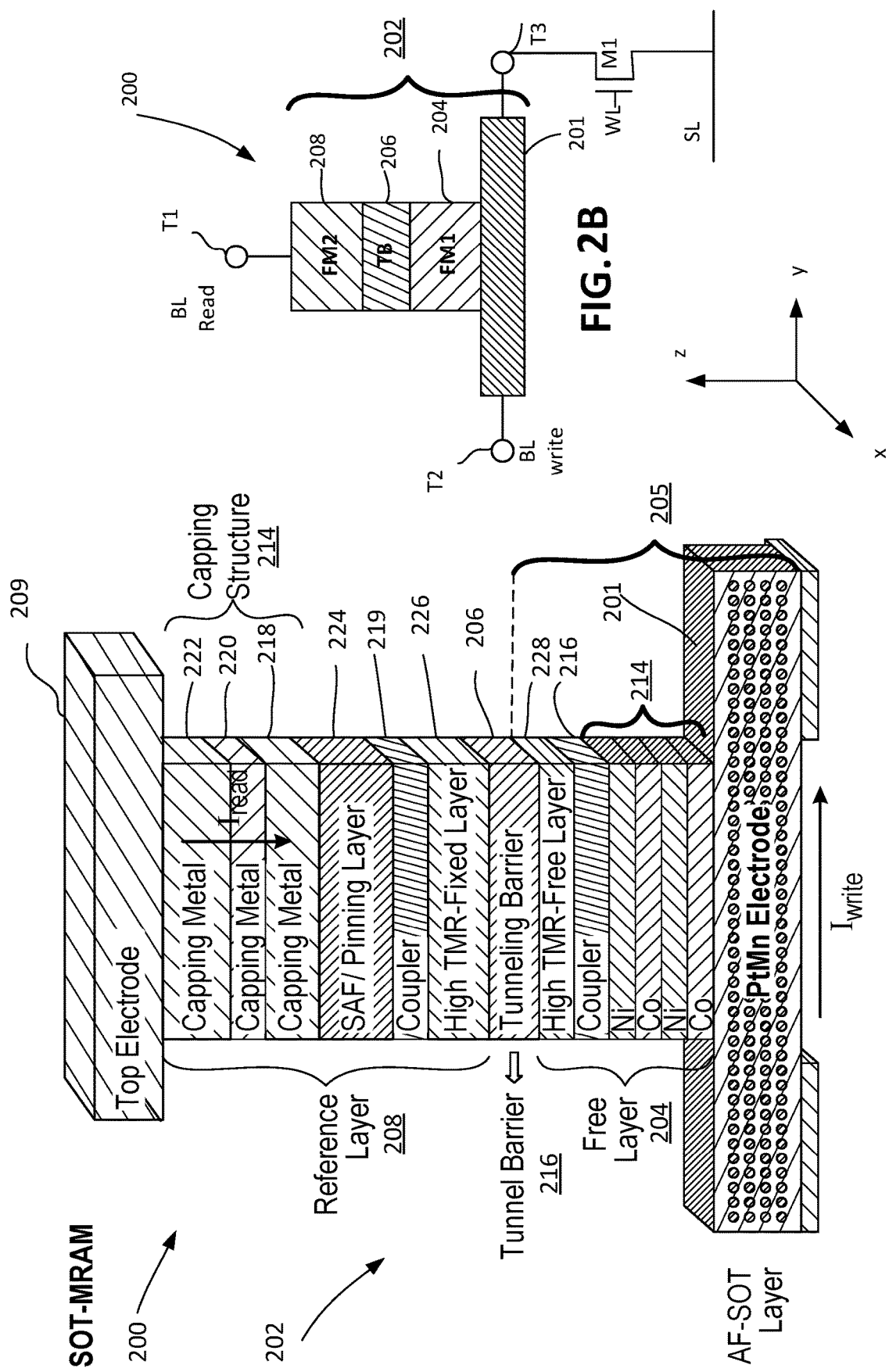

DIFFERENTIALLY PROGRAMMABLE MAGNETIC TUNNEL JUNCTION DEVICE AND SYSTEM INCLUDING SAME

TECHNICAL FIELD

This disclosure relates generally to magnetic tunnel junction devices.

BACKGROUND

Spintronics is the study of intrinsic spin of the electron in solid-state devices. In spintronics, spin transfer torque (STT) and spin orbit torque (SOT) mechanisms manipulate local magnetizations controlled by external magnetic fields. STT refers to the effect by a spin polarized charge current in magnetic materials when there exists a magnetization spatial gradient. SOT results from pure spin current, with no net charge currents generated by the associated spin Hall effect (SHE).

The mechanisms in SOT and STT have been leveraged in SOT and STT magnetic tunnel junction (MTJ) devices, which are magnetic state devices used as digital memory in magnetic random access memory devices (MRAMs). Current solutions use digital SOT and STT MTJ MRAMs in a number of different implementations, including in in-memory compute applications, and for example in artificial intelligence operations. In such cases, multiple MTJs may be used as multiple memory cells in a MRAM, and the corresponding computation is in turn performed on the detector side. The use of multiple MTJ cells in a MRAM may cause the operation of the MRAM device to suffer from inefficiencies, for example in terms of energy and space consumption.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIGS. 2A is a perspective, schematic view of a MTJ SOT MRAM bit cell according to one embodiment of the disclosure.

FIG. 2B is a schematic side view of the MTJ SOT MRAM of FIG. 2A.

DETAILED DESCRIPTION

Figure 1A:
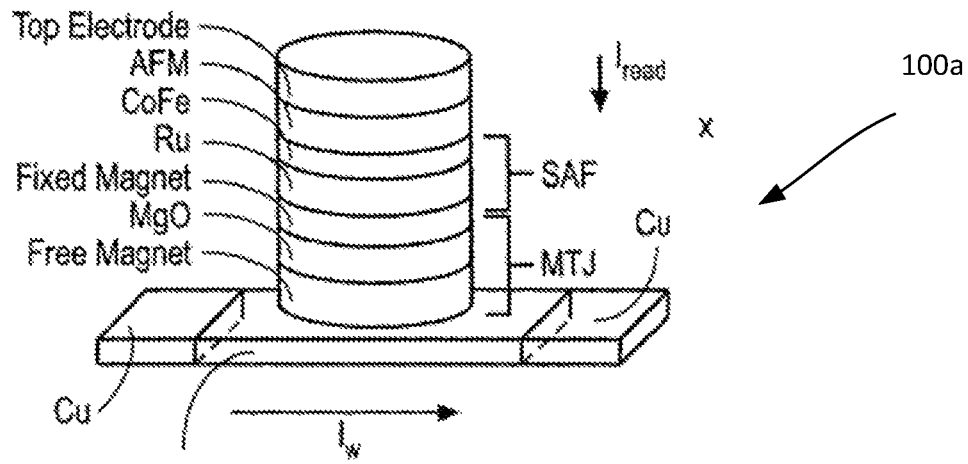
FIG. 1A illustrates a typical material stack for Giant SHE (GSHE) Spin Torque Switching based 1T-1MTJ, according to one embodiment of the disclosure.

Some embodiments provide a memory device including: a first electrode; a second electrode including an antiferromagnetic (AFM) material; and a memory stack including: a first layer adjacent the second electrode and including a multilayer stack of adjacent layers comprising ferromagnetic materials; a second layer adjacent the first layer; and a third layer adjacent the second layer at one side thereof, and adjacent the first electrode at another side thereof, the second layer between the first layer and the third layer, the third layer including a ferromagnetic material. The memory device may correspond to a magnetic tunnel junction (MTJ) magnetic random access memory bit cell, and the memory stack may correspond to a MTJ device.

Advantageously, embodiments provide an energy, time and space efficient memory computing device able to store multiple memory states.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims. In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

In the description of the instant figures, "vertical" refers to the "z" direction, and "horizontal" refers to the "x" direction or the "y" direction, which directions are shown by way of the coordinate systems provided in the figures.

FIG. 1A illustrates a typical material stack 100a for a giant spin Hall effect (GSHE) Spin Torque Switching based magnetic tunnel junction (MTJ) according to one embodiment of the disclosure. In one embodiment, the MTJ stack comprises of free magnetic layer (FM1), MgO tunneling oxide layer, a fixed magnetic layer (FM2) with a Synthetic Anti-Ferromagnet (SAF) layer, which may be CoFe/Ru based, and an antiferromagnet (AFM) layer. The SAF layer allows for cancelling the dipole fields around the free magnetic layer. A wide combination of materials can be used for material stacking in the MTJ stack of FIG. 1A.

The write electrode comprises a GSHE metal which may be, according to the state of the art, be made of β-Tantalum (β-Ta), β-Tungsten (β-W), Pt, Copper (Cu) doped with elements such as Iridium, Bismuth and any of the elements of 3d, 4d, 5d and 4f, 5f periodic groups in the periodic table. In one embodiment, the write electrode transitions into a normal high conductivity metal (e.g., Cu) at ends thereof to minimize the write electrode resistance.

Figure 1B:
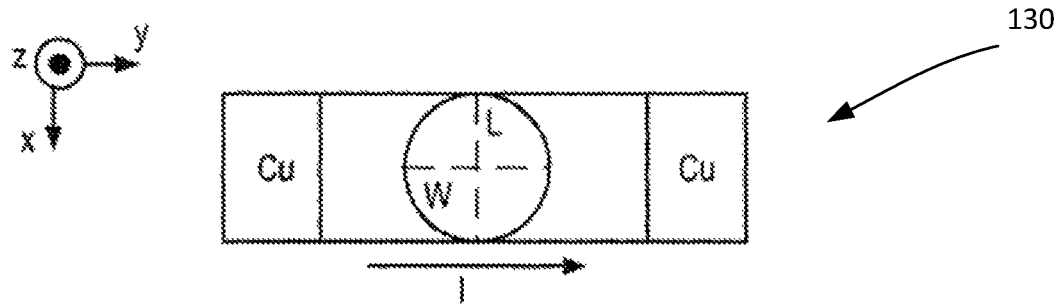
FIG. 1B is a top view of the device of FIG. 1A.

FIG. 1B is a top view 130 of the stack 100a of FIG. 1A. In FIG. 1B, the magnet is oriented along the width of the GSHE electrode for appropriate spin injection. The magnetic cell is subjected to a write operation by applying a write charge current $I_w$ via the GSHE electrode. The direction of the magnetic writing is decided by the direction of the applied charge current. Positive currents along the +y direction produce a spin injection current with transport direction along the +z direction and spins pointing to the +x direction.

Figure 1C:
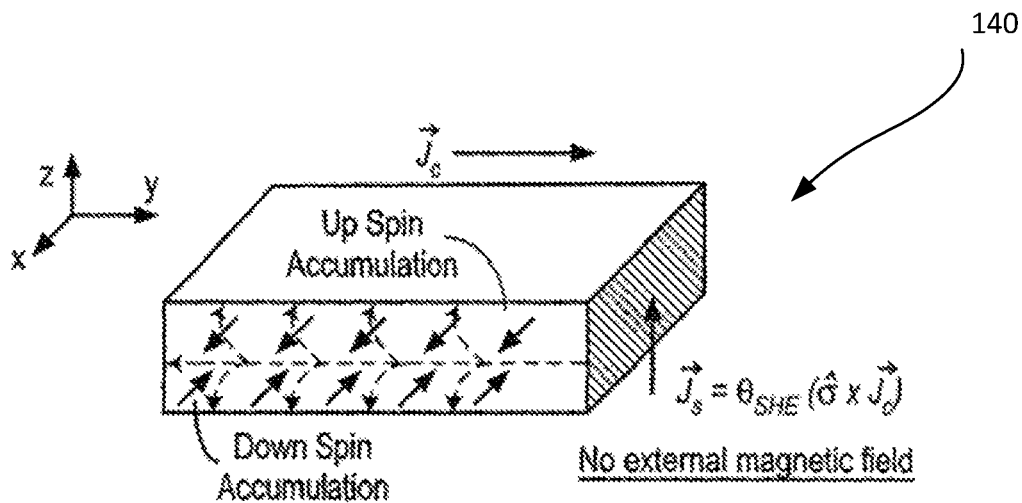
FIG. 1C shows direction of spin currents and charge currents as decided by SHE in metals.

FIG. 1C is a cross-section 240 of the GSHE material that shows the direction of spin currents and charge currents as decided by SHE in metals. The injected spin current in-turn produces spin torque to align the magnet in the +x or −x direction. The transverse spin current $\vec{I}_s = \vec{I}_\uparrow - \vec{I}_\downarrow$ with spin direction $\hat{\sigma}$ for a charge current $\vec{I}_c$ in the write electrode is expressed as:

$$\vec{I}_s = P_{she}(w, t, \lambda_{sf}, \theta_{GSHE}) \hat{\sigma} \times \vec{I}_c \qquad (1)$$

where:
$P_{she} = (\vec{I}_\uparrow - \vec{I}_\downarrow)/(\vec{I}_\uparrow + \vec{I}_\downarrow)$ is the Spin Hall injection efficiency which is the ratio of magnitude of transverse spin current to lateral charge current;
w is the width of the magnet;
t is the thickness of the GSHE metal electrode;
$\lambda_{sf}$ is the spin flip length in the GSHE metal; and
$\theta_{GSHE}$ is the spin Hall angle for the GSHE-metal to FM1 interface.
The injected spin angular momentum responsible for spin torque is given by:

$$\vec{S} = \hbar \vec{I}_s / 2e \qquad (2)$$

It is pointed out that those elements of FIGS. 2A and 2B having the same reference numbers (or names) as the elements of any other figure can operate or function in any manner similar to that described, but are not limited to such.

FIGS. 2A and 2B show a MTJ SOT MRAM bit cell 200, according to one embodiment of the disclosure. In one embodiment, bit cell 200 is a three terminal device, similar to the device 100 of FIGS. 1A-1C, compared to a two terminal bit cell that would be used with a STT MTJ. In this particular embodiment, read and write bit line (BL) terminals are decoupled from one another forming the first two terminals, and the source line (SL), also referred to as the select line, forms the third terminal.

In one embodiment, bit cell 200 comprises an MTJ stack or MTJ device 202 that is located between an electrode 201 including a AFM material (AFM electrode) 201, and a second electrode 209.

In one embodiment, as shown in FIG. 2B, bit cell 200 comprises transistor M1 with one of its drain/source terminals coupled to the AFM electrode 201, and the other of its source/drain terminals coupled to the SL. In one embodiment, transistor M1 is an n-type transistor e.g., NMOS. In one embodiment, transistor M1 is a p-type transistor.

As shown more specifically in FIGS. 2A and 2B, bit cell 200 is a three terminal device presenting two paths, a write path as indicated by $I_w$, which basically writes the state of the device by writing the resistance of the MTJ device (through deterministically coding the magnetization state of the FM1 layer); and a read path along a length of the MTJ device, which can be used to read the resistance by applying a read current $I_r$ in this vertical path and then measuring the resultant voltage using sense amplifier.

FIG. 2B more clearly shows the three terminals of the bit cell 200, including a BL read terminal T1 connected to the read bit line, a terminal T2 at one end of AFM electrode 201, and a terminal T3 at another end of AFM electrode 201. Transistor M1 in the shown embodiment of FIG. 2B is shown as having been connected to terminal T3 at one of its source/drain terminals. Iw is shown as flowing along a length of the AFM electrode 201 between terminals T2 and T3, representing the write path for the write bit line.

MTJ device 202 includes a free ferromagnetic (FM1) layer 204, a fixed or reference ferromagnetic layer (FM2) layer 208, and a tunnel barrier (TB) layer 206 between the FM1 layer 204 and FM2 layer 208. A wide combination of materials can be used for material stacking of the MTJ device 202.

In certain aspects and in at least some embodiments of the present invention, certain terms hold certain definable meanings. For example, the "free" ferromagnetic layer magnetic layer is a ferromagnetic layer adapted to store at least two computational variables. A "fixed" ferromagnetic layer is a magnetic layer with fixed magnetization (magnetically harder than the free magnetic layer). In one embodiment, the free layer may be complex and made of two separate magnetic layers with a coupler layer in between. In one embodiment, the fixed layer is complex and made of two magnets with a coupler layer in between. In yet another embodiment, both the free layer and the fixed layer may be complex.

In one embodiment, AFM electrode 201 may be directly coupled to the write BL. In one embodiment, the read BL may be coupled to another terminal of the MTJ device. In one embodiment, the word line (WL) may be coupled to the gate terminal of transistor M1. In one embodiment, select transistor M1 may be placed in saturation mode to overcome the existing limitation in highly scaled MRAM arrays.

In one embodiment, to write data to bit cell 200, spin current is injected in the free magnetic layer of the MTJ device which is in direct contact with the AFM electrode 201. In one embodiment, to read data from bit cell 200, a sense amplifier may sense the read BL and SL.

According to some embodiments, the AFM material of the AFM electrode 201 may include an antiferromagnetic metal spin orbit torque (SOT) material/spin Hall effect (SHE) material, such as, for example, PtMn, IrMn or FeMn, and the like. A SOT material or SHE material refers to a material that exhibits strong spin orbit coupling or SHE effects.

For example, in one embodiment, the AFM material may comprise a metal antiferromagnet material such as an antiferromagnet material including at least one of Co, Fe, Ni, MnGa, MnGeGa, Bct-Ru, or alloys thereof. In yet another embodiment, the AFM layer may comprise quasi-two-dimensional triangular antiferromagnet materials including $Ni_{1-x}M_xGa2S4$ where M=Mn, Fe, Co or Zn or transition metal di-chalcogenides/topological insulators such as BiSe2, WTe2, WSe2, MoSe2 and the like, IrMn, PtMn, NiMn or other triangular, Kagomi, chiral or hexagonal antiferromagnets either in their single crystal form or in their amorphous alloy form in various compositions.

The stack of materials of the FM1 layer 204, in the shown embodiment, in order from bottom to top above the AFM electrode 201 may include: a multilayer stack of layers including distinct layers ferromagnetic materials (multilayer FM stack) 214 including, in the shown embodiment, alternating layers of Co and Ni, a layer including a coupler material (coupler layer) 216, and a layer including a high tunneling magnetoresistance (TMR) free magnetic material (high TMR free layer) 228. The high TMR free layer 228 is disposed adjacent the TB layer 206.

For example, in one embodiment, the multilayer FM stack 214 may include alternating layers of a first ferromagnetic material and a second ferromagnetic material. In another embodiment, the multilayer FM stack 214 may include distinct layers, where at least two of the layers include different ferromagnetic materials with respect to one another.

For example, in one embodiment, coupler layer 216 may include Ru, Ir, W, or Ta. The coupler material of the coupling layer 216 is to couple the magnetization state of the high TMR free layer 228 to that of the superlattice 214.

For example, in one embodiment, the TB layer 206 may include a TB material such as MgO, $Al_2O_3$, EuO, or their alloys.

The FM2 layer 208 is disposed adjacent the TB material, and may include a layer including a high TMR fixed magnetic material (high TMR fixed layer) 226, a layer including a coupler material (coupler layer) 218 on the high TMR fixed layer, a SAF/pinning layer 224 on the coupler layer 219, and a capping structure 212 on the SAF pinning layer 224 including alternating layers of capping metal.

For example, in one embodiment, any of high TMR free layer 228 or high TMR fixed layer 226 may comprise a high TMR material such as $Co_\alpha X_\beta Pt_\lambda$ where (X=Cu, Ni, Mn, Cr) alloy, wherein α ranges from 20 to 50, β ranges from 0 to 30, and λ ranges from 40 to 60, with the proviso that=α+β+λ=100. An example high TMR material for any of layers 226 or 228 may include $Co_{40}Cu_{10}Pt_{50}$ alloy, which is ferromagnetic. In one embodiment, the high TMR material may have a FCC or rhombohedral crystal structure along (111) orientation or a HCP crystal structure along (0002) orientation such that it exhibits PMA. The thickness of the high TMR layers 226 or 228 may be from 20 A to 100 A. The high TMR layers 226 or 228 may be formed by PVD at a temperature range from 150° C. to 450° C. The high TMR layers 226 or 228 may also be formed using other techniques or processes as well.

The SAF/pinning layer 224 allows for cancelling the dipole fields around the free magnetic layer. The SAF/pinning layer 224 may comprise any of the materials listed for the AFM layer 201 above.

Coupler layer 219 may aid the SAF/pinning layer in pinning the fixed layer, and centers the magnetic hysteresis loop by overcoming the dipole field between the fixed and the free magnetic layers. In one embodiment, the coupler layer may comprise Ru, Ir, W, or Ta.

In other embodiments, other materials may be used to form the MTJ device.

The AFM-FM interface 207 of the AFM-FM1 bilayer results in an exchange bias in the magnetic behavior of the FM1 layer. The exchange bias is exhibited by way of an in-plane magnetic field at the AFM-FM1 layer interface 207. In the example embodiment of FIGS. 2A and 2B, the AFM-FM1 bilayer interface, by virtue of the AFM electrode being made of a SHE metal, further generates SHE effects by virtue of the application of a write current $I_w$ along a length of the AFM electrode 201. Thus, in FIGS. 2A and 2B, by flowing $I_w$ in the +y direction for example, by virtue of SHE, once can cause a spin current $I_s$ within the AFM layer 201, which in turn causes a change in the direction of the magnetization within the FM1 204 layer. Thus, through application of $I_w$, one can deterministically switch the perpendicular magnetization of the FM1 layer.

A property of the shown MTJ device 202 is its ability to cause intermediate switching levels or states for the magnetization of FM1 layer for different amplitudes of $I_w$, meaning that the FM1 layer may not necessary switch its magnetization as a whole, but rather exhibit multidomain switching behavior with various levels of magnetization states for the FM1 layer, the levels depending on the amplitude of spin current $I_s$ from AFM layer 201, leading to multiple (i.e. more than two) resistance values of the MTJ device 202 corresponding to different levels of magnetization of domains within the FM1 layer.

A reason behind the ability of FM1 layer 204 to exhibit multiple magnetization states is that the FM1 layer is to exhibit magnetization switching via domain nucleation, that is, via magnetic nucleation within discrete domains separate by domain walls inside the FM1 layer, such as in the multilayer FM stack 214. For the magnetization of the entire FM1 layer to switch in a uniform manner, additional energy would be necessary to propagate the domain nucleation uniformly across domain boundaries. The MTJ device 200 has a configuration from that of existing FM and heavy metal electrode systems (such as the GSHE electrode of FIGS. 1A-1C) where the metal electrode includes metals such as cobalt, iron, boron and tantalum. In the latter kind of system, once a domain nucleates to a given magnetization states, the domain propagation energy is low enough that the domain nucleation (and hence associated magnetization state) propagates and switch the entirely of the FM1 layer. In AFM-FM bilayer configuration of embodiments, as shown by way of example in FIGS. 2A and 2B, domain propagation does not happen ready, leading to multiple nucleation events contributing to discrete domains of magnetization states for different values of the write current $I_w$. Thus, more than two value for $I_w$ can allow a coding of multiple magnetization states within MTJ device 202.

The larger the area of the AFM-FM interface 207, the more magnetization states one may be able to fit within an MTJ device in a SOT MRAM. The exchange interaction or exchange bias at interface 207 is brought about by the quantum effect of spins in the AFM material and in the material of the FM1 layer at the interface 207. The exchange bias promotes creation of domain walls within the FM1 layer which in turn makes possible the provision of intermediate resistance states of the MTJ device as a whole. The provision of a structure such as that of FIG. 2B, or of FIG. 3 to be described below, including a AFM electrode 201 and a FM1 layer, TB layer and FM2 layer structure on the AFM electrode 201, will make it possible to obtain resistances from the MTJ devices that are measurable by a sense amplifier (such resistances, for one example of a MTJ device according to embodiments, may for example be in the order of thousands of Ohms, for example between 5000 and 10,000 Ohms.

An effect of the multilayer FM stack 214 is to make the programming of multiple resistances of the MTJ device possible. In the shown example of FIGS. 2A and 2B, the FM stack 214 includes a superlattice of alternating Co and Ni layers, which causes the perpendicular anisotropy (perpendicular to the in-plane direction of AFM-FM interface 207) that allows the direction of magnetization of the FM1 layer 204 to point in the +z or −z direction. For some common ferromagnetic materials such as Co, Fe or Bo, an AFM electrode may not present an ideal solution to achieving a perpendicular (vertical) ferromagnetism. However, in a multilayered structure such as that of FM stack 214, the perpendicular ferromagnetism relies on the interface between the various ferromagnetic materials, such as cobalt and nickel in the shown example of FIGS. 2A and 2B, and not as much on the AFM-FM interface 207. Therefore, having a FM stack of differing and/or alternating FM materials may be advantageous in achieving perpendicular anisotropy where multi-domain magnetic switching is desired to allow the programming of multiple resistances in a same MTJ device.

A vertical/perpendicular magnetization direction for the FM1 layer is more controllable, and makes for a more compact MTJ devices where relying on an in-plane magnetization direction would have required a MTJ device with a much larger footprint. Having a FM stack with multiple layers of different FM materials achieves multiple magnetization domains by among other things presenting multiple interfaces, where each interface adds to the energy that would be required to make the magnetization within the FM1 layer uniform and to overcome the FM1 layer shape anisotropy.

Figure 3:
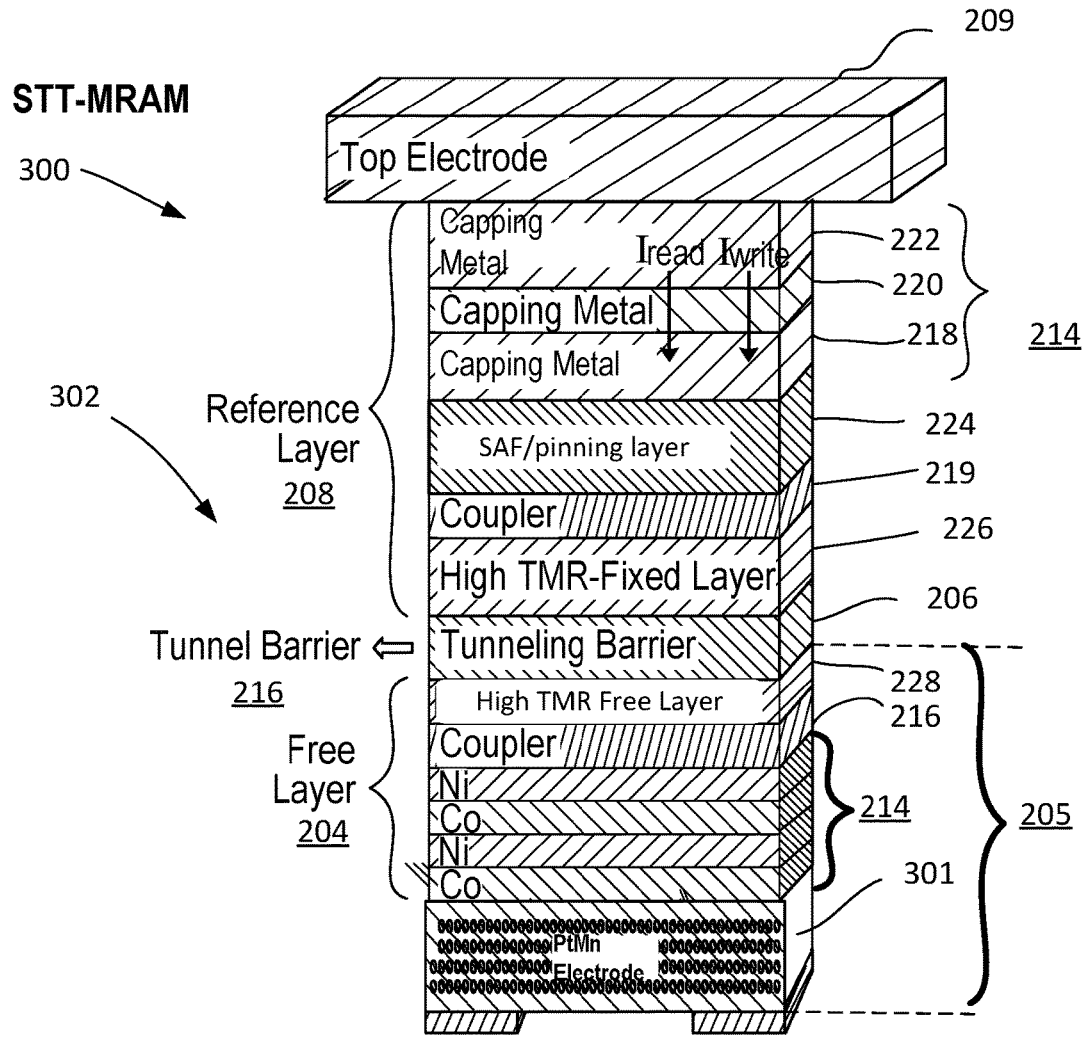
FIG. 3 is a perspective, schematic view of a MTJ STT MRAM bit cell according to one embodiment of the disclosure.

FIG. 3 illustrates a MTJ STT MRAM bit cell 300, according to one embodiment of the disclosure. Bit cell 300 is a two terminal device. The MTJ device 302 has a configuration similar to the MTJ device 202 of FIG. 2A, except that AFM electrode 301 in FIG. 3 is shorter and is used only as a single terminal rather than being connected to two terminals as in AFM electrode 201, and, therefore, the descriptions of the various layers of MTJ 302 will be omitted here. For the STT-MRAM, the read and write current paths for bit cell 300 are identical. Write current $I_w$ represents a spin polarized charge current which flows through a magnetization spatial gradient of the FM2 layer and the FM1 layer. $I_w$ causes the generation of a spin current $I_s$ at the AFM-FM interface between the AFM electrode 201 and FM1 layer 204, and along with the in-plane magnetization at the AFM-FM interface 207, causes a resistance state to be coded into the MTJ 202 based on the amplitude of $I_w$. Reading various resistance states of the MTJ device 302 involve applying a current $I_{read}$ across the top and bottom electrodes 209 and 201, and determining the voltage across the two electrodes to determine resistance.

Figure 4:
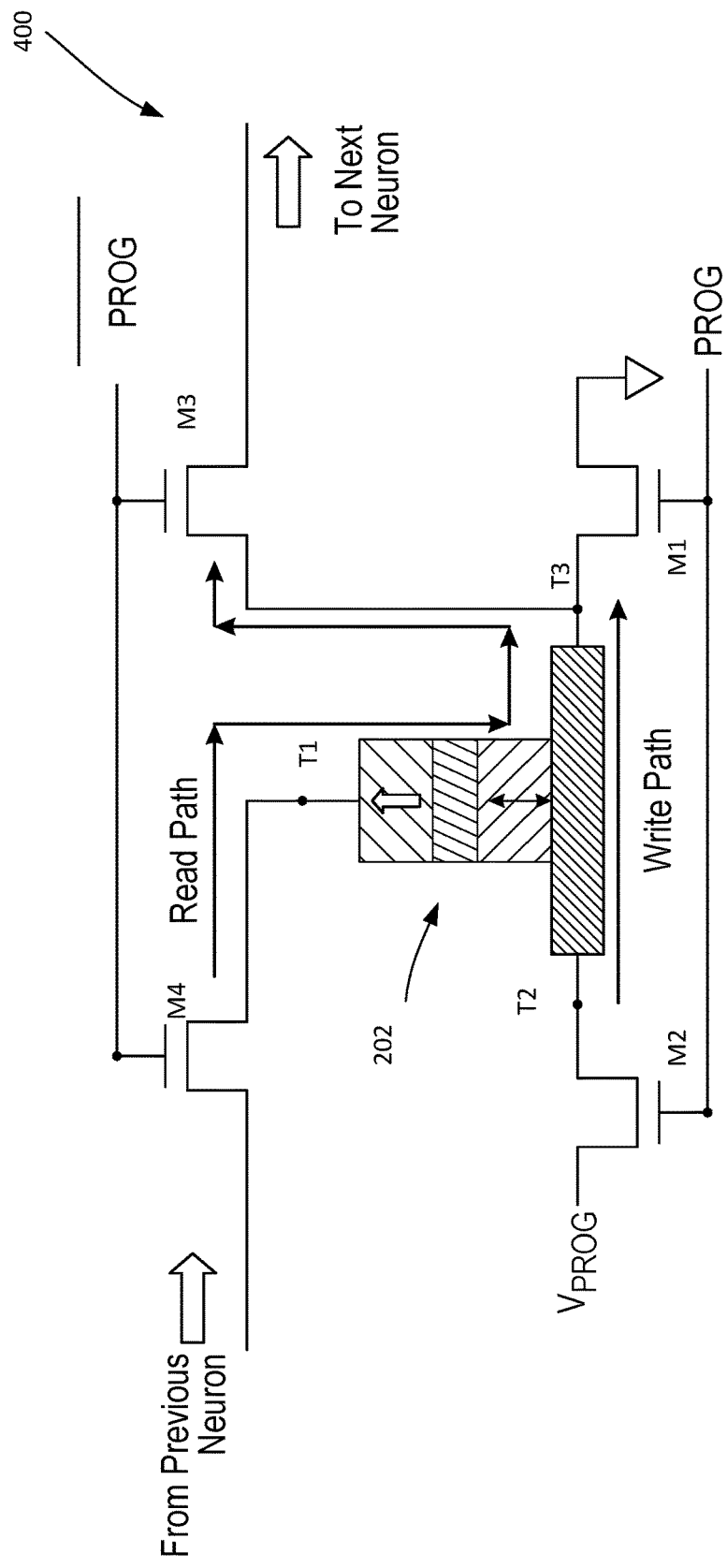
FIG. 4 is a side view of another embodiment of a MTJ SOT MRAM bit cell according to an alternative embodiment to that of FIG. 2B.

Reference is now made to FIG. 4, which shows another embodiment of a MTJ SOT MRAM bit cell 400. The embodiment of the bit cell 400 of FIG. 4 may be used for example in a neural network circuit where bit cells such as bit cells 400 are connected serially, such that a resistance state of one MTJ, as represented by the voltage drop for example between T1 and T3, may be used to provide a bias input into the read path or read bit line of a next MTJ within the neural network circuit. In the shown bit cell 400 of FIG. 4, we have a four transistor architecture example where a MTJ according to some embodiments, such as MTJ 202 of FIG. 2A, is connected at its read terminal T1 to one of a source/drain region of a transistor M4. Terminal T2 is connected to one of a source/drain region of a transistor M2, and terminal T2 is connected to one of a source/drain region of a transistor M1. T3 is further connected to one of the source/drain region of a transistor M3, the other source/drain of which corresponds to a read bit line of a next MTJ. M4 and M3 share a common gate voltage $\overline{PROG}$ and M1 and M2 share a common gate voltage PROG. The path between T2 and T3 represents the write path or the write bit line, while the read path is between T1 and T3.

In the program phase, when a resistance is to be written into the MTJ 202 of FIG. 4, PROG is brought high (a voltage pulse is supplied to the gates of M1 and M2 to have M1 and M2 conduct, and in this way to generate Iw between T2 and T3, and $\overline{PROG}$ is low. That means that we have these two transistors conducting and we have this path open. Depending on the absolute value of the program voltage applied at PROG, we will have a different amount of current Iw and hence a different amount of FM1 layer magnetism switching, and thus a different resistance programmed into the MTJ. The resistance may for example correspond to a weight used for modeling in a neural network to implement machine learning.

During a read operation, PROG is turned off, M1 and M2 are not conducting, and no Iw flows. $\overline{PROG}$ is brought high (a voltage pulse is applied to the gates of transistors M3 and M4), which means that $I_{read}$ flows between T1 and T3. The voltage drop across MTJ 202, and hence the voltage at T3, will depend on the resistance of the MTJ 202. This voltage is applied at one of the source/drain regions of M3, which then determines the amount of voltage applied at one of the source/drain of the M1 connected to the T1 of the next neuron or bit cell. The $I_{read}$ at the next MTJ may therefore correspond to the input voltage input to a previous neuron multiplied by the conductance of that neuron as programmed during our program cycles. In this manner, a bit cell using a MTJ according to embodiments may be used as a synapse in a neural network.

Referring now to FIG. 5A, a neuromorphic computing system 500a is shown including M pre-neurons (or an array of previous bit cells including MTJs), an array of synapse such as an array of bit cells such as bit cell 200 of FIG. 2B r bit cell 400 of FIG. 4, and N post neurons (or an array of subsequent bit cells including MTJs). For resistance read-outs, corresponding to weight determination in a neuromorphic computing system implementing, for example, machine learning, the array of previous neurons, with an array of corresponding programmed resistances, may be connected to the inputs T1 of bit cells according to some embodiments. The previous neurons are supplying a voltage to the bit cells of the synapse array. There would therefore need to be M×N weights in the synapse array. The currents generated in the synapse array, will have different values based on the different connection branches between the previous neurons and the bit cells within the synapse. The currents may be summed at the output of the synapse array, and converted back into a voltage that corresponds to a weighted sum of the voltages at the input of the synapse array, and so forth through the neural network.

Figure 5:
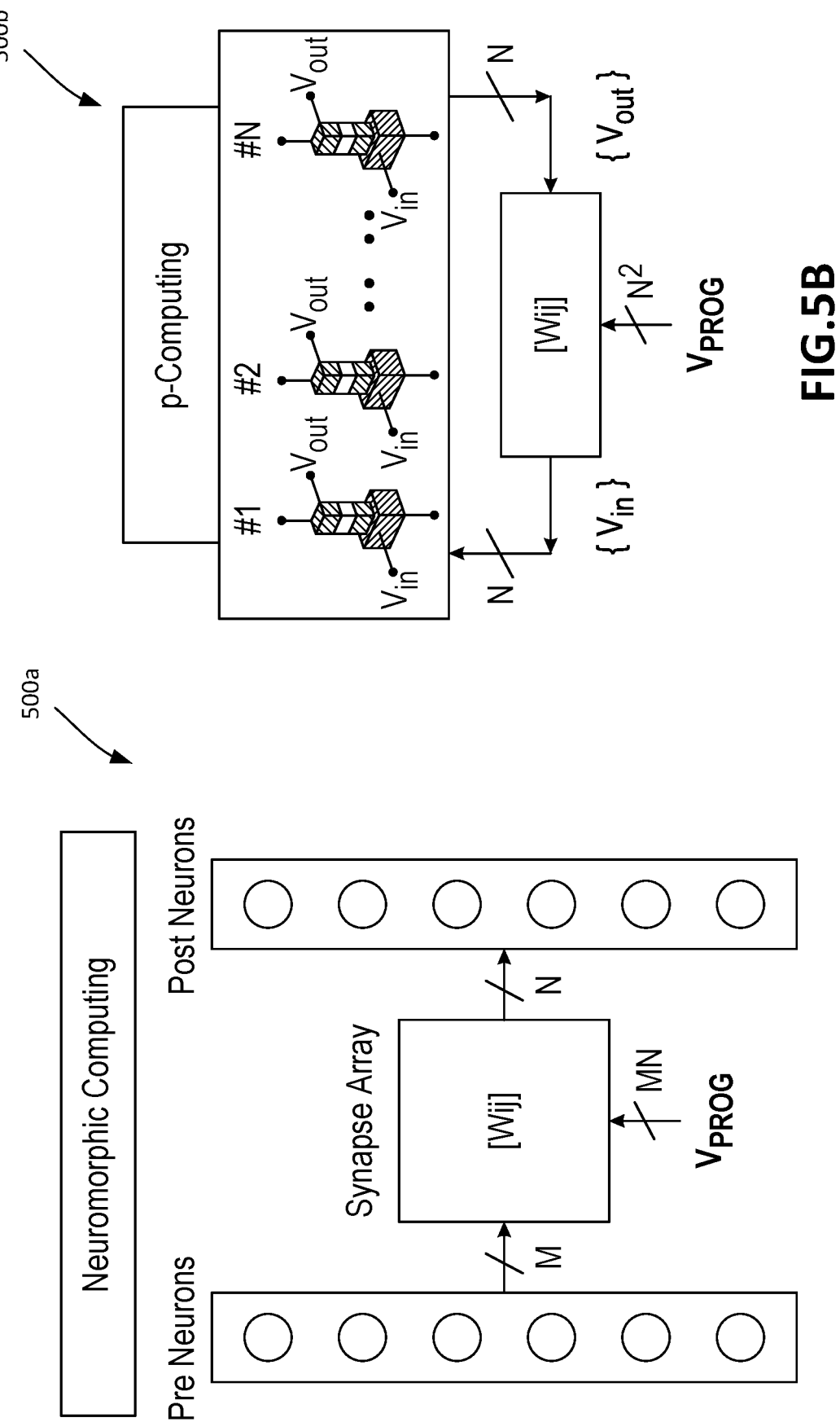
FIG. 5A illustrates a neuromorphic computing system including MTJ devices according to some embodiments.
FIG. 5B illustrates a probabilistic computing system including MTJ devices according to some embodiments.

Reference is now made to FIG. 5B, which shows a probabilistic computing system 500b, an emerging a computing paradigm including neurons similar to the ones described in the context of FIG. 5. System 500b includes a N×N square array of neurons to provide square weights, the neurons for example including SOT bit cells similar to those shown in FIGS. 2A and 2B. The square array of weights supplies Vin into an array of N neurons, for example including SOT bit cells similar to those shown in FIGS. 2A and 2B, and uses as its input the Vout from the N neurons.

According to some embodiments, the output of each array of neurons, for example a square or rectangular array, may be connected to a sense amplifier, which may sense the sum of the currents from the array of neurons.

Advantageously, embodiments provide MTJ devices that are differentially programmable, making such devices useful as bit cells that can serve as neurons or synapses in a neural network. The differential programmability of resistances for each MTJ devices makes it possible to have each MTJ devices exhibit more than two logical values (0 and 1), such as a spread of resistance values between 0 and 1 as determined by the write current applied to the MTJ device. Thus, instead of a digital MTJ devices, embodiments make possible the provision of analog MTJ devices.

Figure 6:
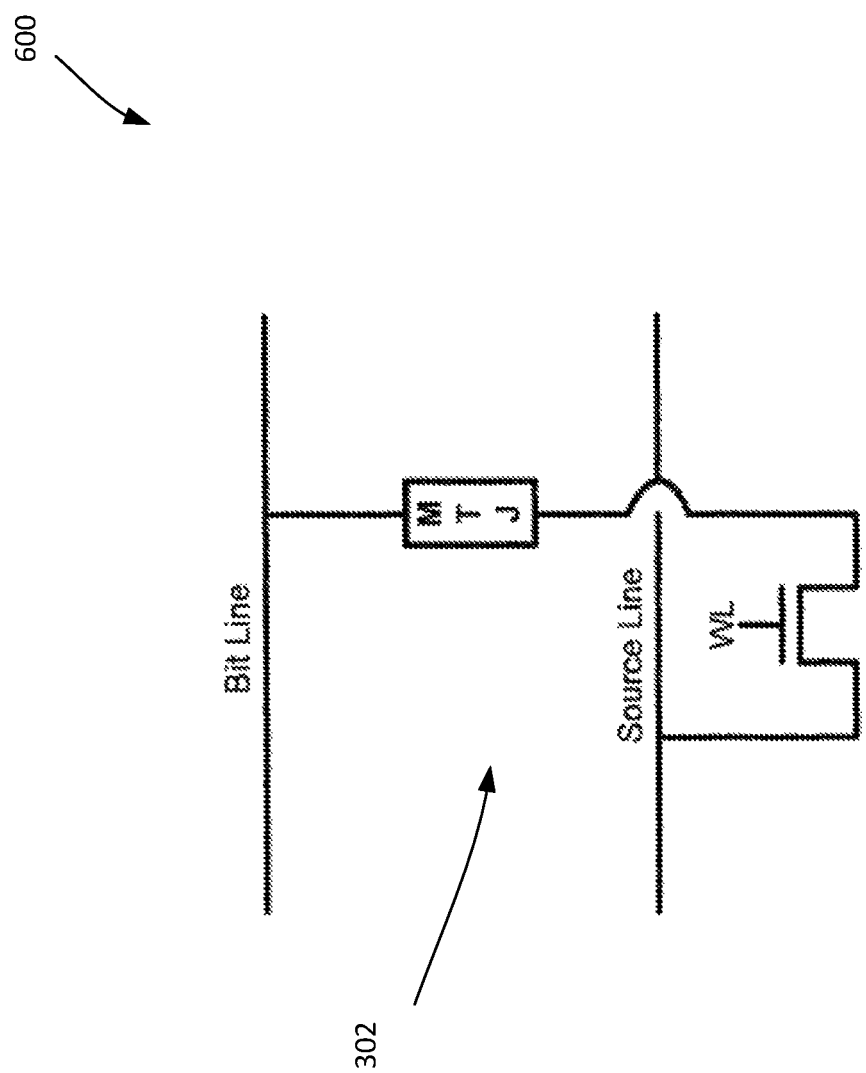
FIG. 6 illustrates a two terminal 1T-1MTJ (Magnetic Tunnel Junction) bit cell for STT-MRAM according to one embodiment.

FIG. 6 illustrates a two terminal 1T-1MTJ (Magnetic Tunnel Junction) bit cell 600 for STT-MRAM. The MTJ in the bit cell 600 may have configuration according to some embodiments, such as the configuration of the MTJ 302 of FIG. 3. For the STT-MRAM, the read and write current paths for bit cell 600 are identical. To write a logical high to bit cell 600, the bit line is raised relative to the source line, and to write a logical low to bit cell 600, the bit line is lowered relative to the source line. To read from bit cell 600, the source line is set to logical low and MTJ resistance is sensed using a weak current (e.g., $1/8^{th}$ of the write current $I_w$).

Figure 7:
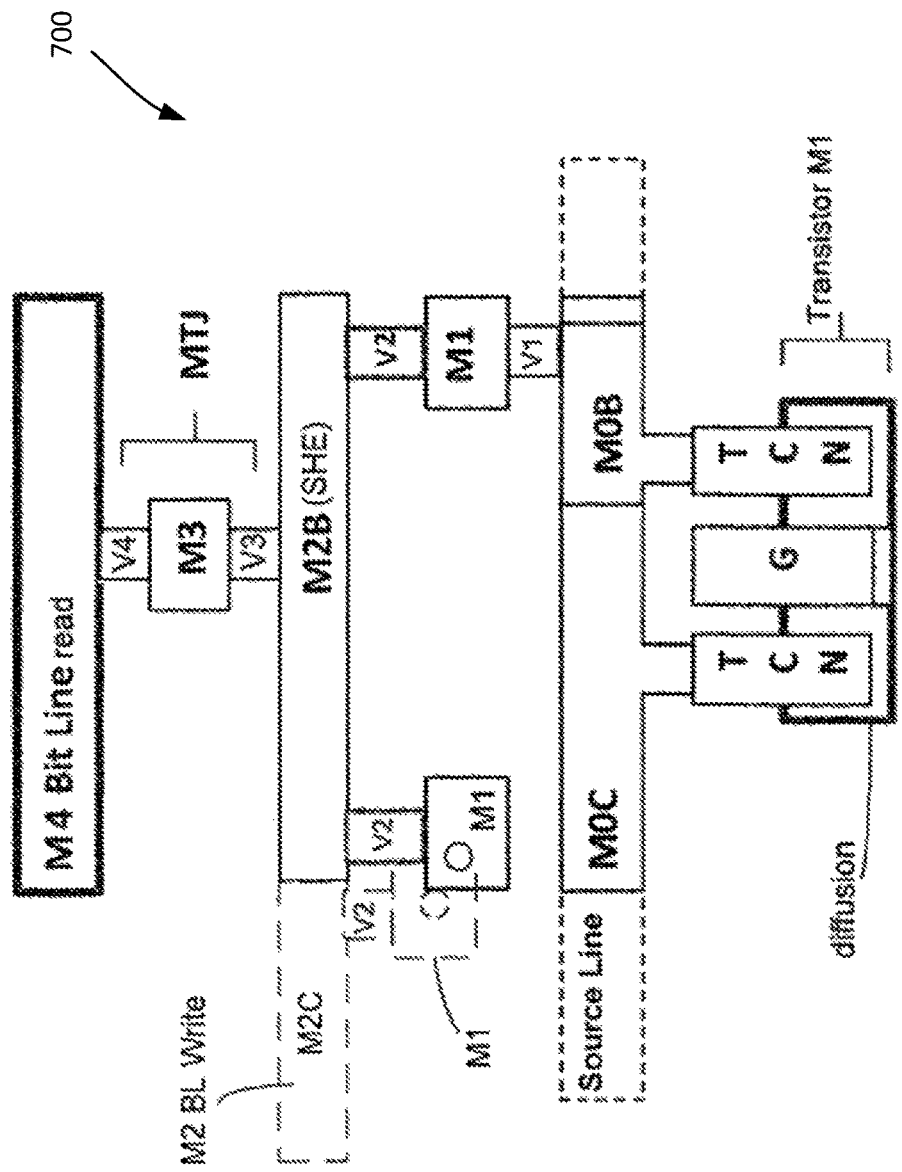
FIG. 7 is a cross sectional view of a 1T-1MTJ SOT MRAM bit-cell, according to one embodiment of the disclosure.

FIG. 7 shows is a cross sectional view 720 of 1T-1MTJ SOT MRAM bit-cell 200, according to one embodiment of the disclosure. In one embodiment, the source and drain regions of transistor M1 are coupled to metal layers for trench contacts (TCN) and in turn couple to MOC and MOB lines respectively, where MOC and MOB are segments of metal in the MO layer. In one embodiment, MOC is a continuous line for a row of bit-cells in an array. In one embodiment, source line (SL) is coupled to MOC. In one embodiment, MOB is coupled to M2 layer through via V1, first metal layer (M1), and via V2. In one embodiment, via V2 couples to M2B (segment in M2 layer) and is indirectly coupled to write BL through M2C. In one embodiment, M2B is coupled to M2C through via V2, another segment of M1, and back to M2C through another via V2 coupled to M1, as shown in the dotted region. In one embodiment, MTJ device 202 is located in regions of via V3, M3, and via V4. One end of the MTJ device 202 is coupled to M2B through via V3 while the other end of the MTJ device is coupled to read BL on M4 through via V4. In this embodiment, M2B is the AFM electrode 201 with SHE material. The MTJ layer may be located in a back end of the complementary metal oxide semiconductor (CMOS) stack occupying the vertical location of V3-M3-V4. M2C (on M2) BL write, M4 BL read, and MO SL may be shared between bit-cells. In this latter embodiment, the local AFM electrode interconnects with SHE material, which are directly coupled to free magnet layer of the respective MTJ devices of the two bit-cells, are not shared between bit-cells i.e., AFM electrode SHE interconnect may not be shared with adjacent cells of a row of bit-cells.

In some embodiments, the contacts, electrodes, interconnects and non-magnetic conductors shown or described herein may be formed of non-magnetic metal (e.g., Cu, Ag, etc.).

Figure 8:
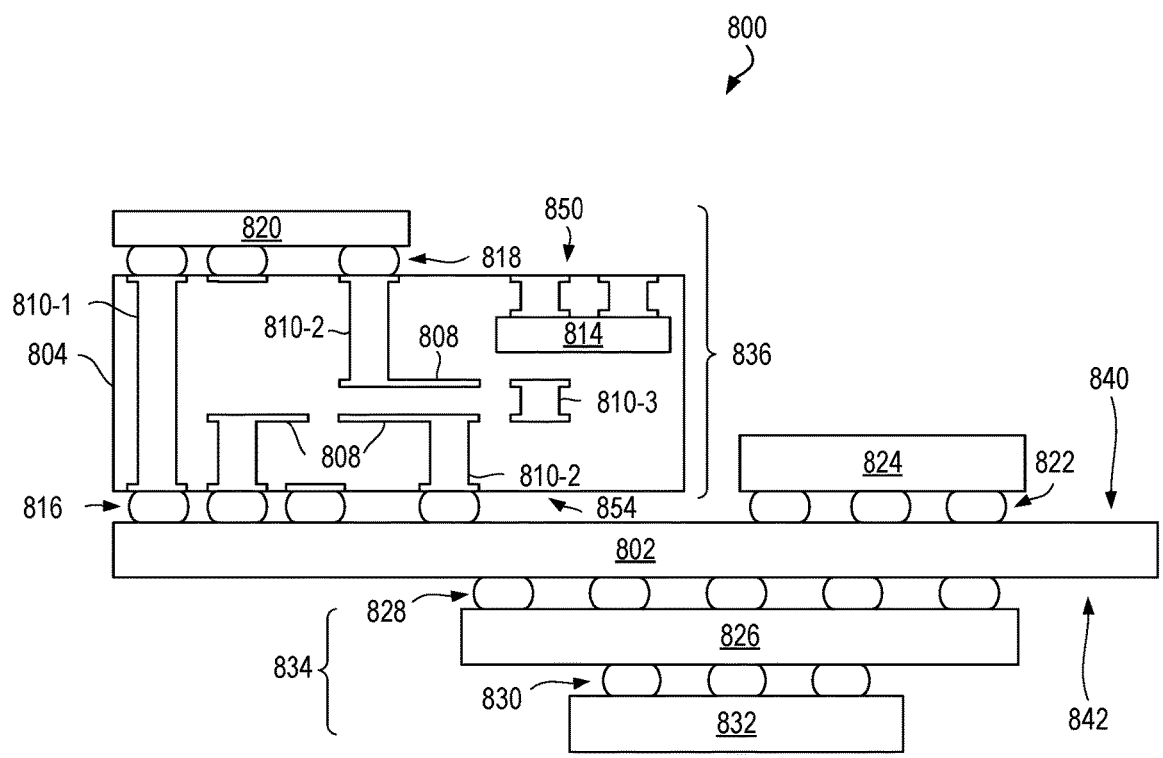
FIG. 8 is a cross-sectional side view of an integrated circuit device assembly that may include a microelectronic assembly, in accordance with any of the embodiments disclosed herein.

FIG. 8 is a cross-sectional side view of an integrated circuit device assembly 800 that may include any of the MTJ devices disclosed herein. In some embodiments, the integrated circuit device assembly 800 may include an array of MTJ devices for a neural network system. The integrated circuit device assembly 800 includes a number of components disposed on a circuit board 802 (which may be a motherboard, system board, mainboard, etc.). The integrated circuit device assembly 800 includes components disposed on a first face 840 of the circuit board 802 and an opposing second face 842 of the circuit board 802; generally, components may be disposed on one or both faces 840 and 842. Some of the integrated circuit components discussed below with reference to the integrated circuit device assembly 800 may take the form of any suitable ones of the embodiments of the MTJ devices, array of MTJ devices, or dies including MTJ devices disclosed herein.

In some embodiments, the circuit board 802 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 802. In other embodiments, the circuit board 802 may be a non-PCB substrate. The integrated circuit device assembly 800 illustrated in FIG. 8 includes a package-on-interposer structure 836 coupled to the first face 840 of the circuit board 802 by coupling components 816. The coupling components 816 may electrically and mechanically couple the package-on-interposer structure 836 to the circuit board 802, and may include solder balls (as shown in FIG. 8), pins (e.g., as part of a pin grid array (PGA), contacts (e.g., as part of a land grid array (LGA)), male and female portions of a socket, an adhesive, an underfill material, and/or any other suitable electrical and/or mechanical coupling structure.

The package-on-interposer structure 836 may include an integrated circuit component 820 coupled to an interposer 804 by coupling components 818. The coupling components 818 may take any suitable form for the application, such as the forms discussed above with reference to the coupling components 816. Although a single integrated circuit component 820 is shown in FIG. 8, multiple integrated circuit components may be coupled to the interposer 804; indeed, additional interposers may be coupled to the interposer 804. The interposer 804 may provide an intervening substrate used to bridge the circuit board 802 and the integrated circuit component 820.

The integrated circuit component 820 may be a packaged or unpacked integrated circuit product that includes one or more MTJ devices as described herein and/or one or more other suitable components. A packaged integrated circuit component comprises one or more integrated circuit dies mounted on a package substrate with the integrated circuit dies and package substrate encapsulated in a casing material, such as a metal, plastic, glass, or ceramic. In one example of an unpackaged integrated circuit component 820, a single monolithic integrated circuit die comprises solder bumps attached to contacts on the die. The solder bumps allow the die to be directly attached to the interposer 804. The integrated circuit component 820 can comprise one or more computing system components, such as one or more processor units (e.g., system-on-a-chip (SoC), processor core, graphics processor unit (GPU), accelerator, chipset processor), I/O controller, memory, or network interface controller.

In some embodiments, the integrated circuit component 820 can comprise one or more additional active or passive devices such as capacitors, decoupling capacitors, resistors, inductors, fuses, diodes, transformers, sensors, electrostatic discharge (ESD) devices, and memory devices.

In embodiments where the integrated circuit component 820 comprises multiple integrated circuit dies, they dies can be of the same type (a homogeneous multi-die integrated circuit component) or of two or more different types (a heterogeneous multi-die integrated circuit component). A multi-die integrated circuit component can be referred to as a multi-chip package (MCP) or multi-chip module (MCM).

In addition to comprising one or more processor units, the integrated circuit component 820 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof Generally, the interposer 804 may spread connections to a wider pitch or reroute a connection to a different connection. For example, the interposer 804 may couple the integrated circuit component 820 to a set of ball grid array (BGA) conductive contacts of the coupling components 816 for coupling to the circuit board 802. In the embodiment illustrated in FIG. 8, the integrated circuit component 820 and the circuit board 802 are attached to opposing sides of the interposer 804; in other embodiments, the integrated circuit component 820 and the circuit board 802 may be attached to a same side of the interposer 804. In some embodiments, three or more components may be interconnected by way of the interposer 804.

In some embodiments, the interposer 804 may be formed as a PCB, including multiple metal layers separated from one another by layers of dielectric material and interconnected by electrically conductive vias. In some embodiments, the interposer 804 may be formed of an epoxy resin, a fiberglass-reinforced epoxy resin, an epoxy resin with inorganic fillers, a ceramic material, or a polymer material such as polyimide. In some embodiments, the interposer 804 may be formed of alternate rigid or flexible materials that may include the same materials described above for use in a semiconductor substrate, such as silicon, germanium, and other group III-V and group IV materials. The interposer 804 may include metal interconnects 808 and vias 810, including but not limited to through hole vias 810-1 (that extend from a first face 850 of the interposer 804 to a second face 854 of the interposer 804), blind vias 810-2 (that extend from the first or second faces 850 or 854 of the interposer 804 to an internal metal layer), and buried vias 810-3 (that connect internal metal layers).

In some embodiments, the interposer 804 can comprise a silicon interposer. Through silicon vias (TSV) extending through the silicon interposer can connect connections on a first face of a silicon interposer to an opposing second face of the silicon interposer. In some embodiments, an interposer 804 comprising a silicon interposer can further comprise one or more routing layers to route connections on a first face of the interposer 804 to an opposing second face of the interposer 804.

The interposer 804 may further include embedded devices 814, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 804. The package-on-interposer structure 836 may take the form of any of the package-on-interposer structures known in the art. In embodiments where the interposer is a non-printed circuit board The integrated circuit device assembly 800 may include an integrated circuit component 824 coupled to the first face 840 of the circuit board 802 by coupling components 822. The coupling components 822 may take the form of any of the embodiments discussed above with reference to the coupling components 816, and the integrated circuit component 824 may take the form of any of the embodiments discussed above with reference to the integrated circuit component 820.

The integrated circuit device assembly 800 illustrated in FIG. 8 includes a package-on-package structure 834 coupled to the second face 842 of the circuit board 802 by coupling components 828. The package-on-package structure 834 may include an integrated circuit component 826 and an integrated circuit component 832 coupled together by coupling components 830 such that the integrated circuit component 826 is disposed between the circuit board 802 and the integrated circuit component 832. The coupling components 828 and 830 may take the form of any of the embodiments of the coupling components 816 discussed above, and the integrated circuit components 826 and 832 may take the form of any of the embodiments of the integrated circuit component 820 discussed above. The package-on-package structure 834 may be configured in accordance with any of the package-on-package structures known in the art.

Figure 9:
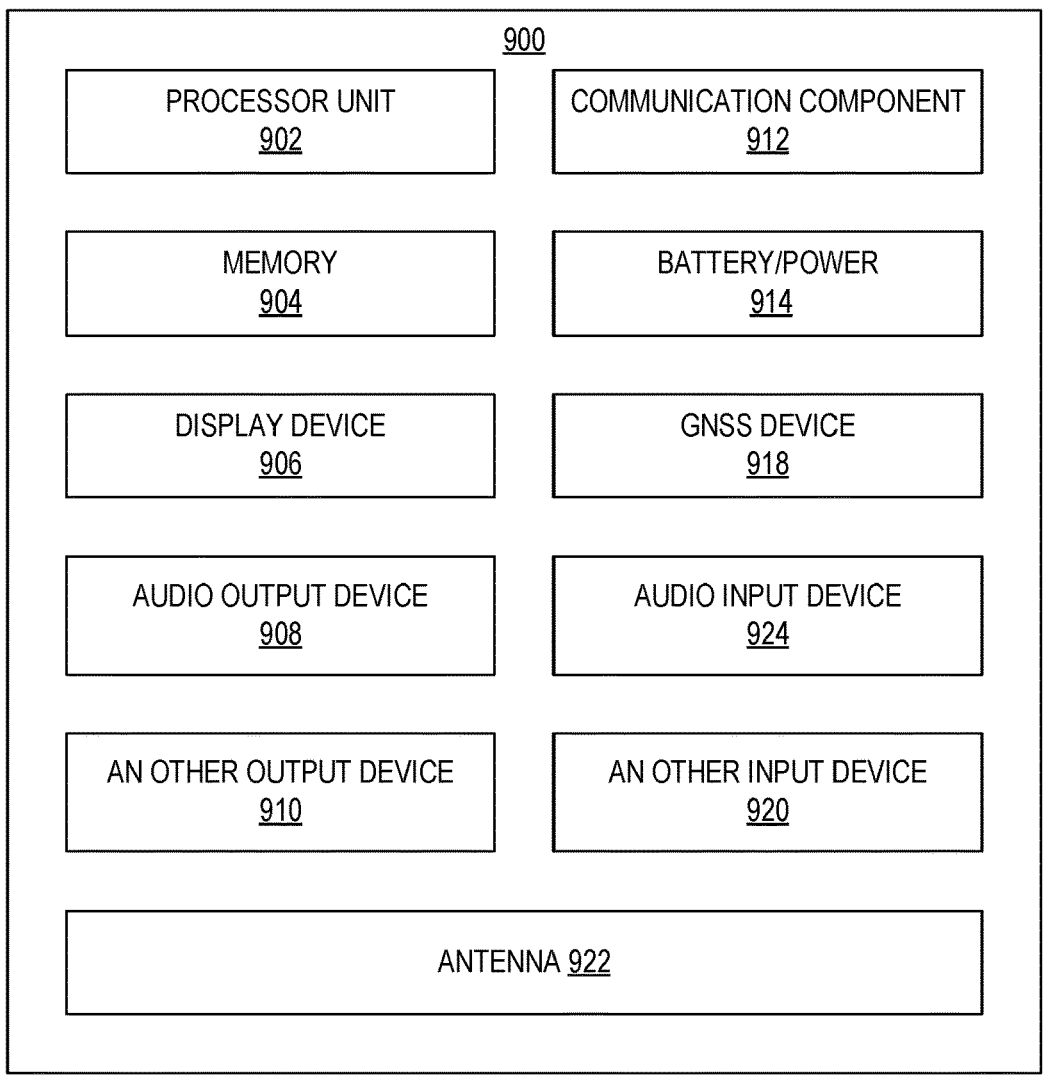
FIG. 9 is a block diagram of an example electrical device that may include a microelectronic assembly, in accordance with any of the embodiments disclosed herein.

FIG. 9 is a block diagram of an example electrical device 900 that may include one or more of the MTJ devices disclosed herein. For example, any suitable ones of the components of the electrical device 900 may include one or more of the integrated circuit device assemblies 800, integrated circuit components 820, MTJ devices as disclosed herein, or integrated circuit dies including MTJ devices as disclosed herein, and may be arranged in any of the MTJ devices disclosed herein. A number of components are illustrated in FIG. 9 as included in the electrical device 900, but any one or more of these components may be omitted or duplicated, as suitable for the application. In some embodiments, some or all of the components included in the electrical device 900 may be attached to one or more motherboards mainboards, or system boards. In some embodiments, one or more of these components are fabricated onto a single system-on-a-chip (SoC) die.

Additionally, in various embodiments, the electrical device 900 may not include one or more of the components illustrated in FIG. 9, but the electrical device 900 may include interface circuitry for coupling to the one or more components. For example, the electrical device 900 may not include a display device 906, but may include display device interface circuitry (e.g., a connector and driver circuitry) to which a display device 906 may be coupled. In another set of examples, the electrical device 900 may not include an audio input device 924 or an audio output device 908, but may include audio input or output device interface circuitry (e.g., connectors and supporting circuitry) to which an audio input device 924 or audio output device 908 may be coupled.

The electrical device 900 may include one or more processor units 902 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 902 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

The electrical device 900 may include a memory 904, which may itself include one or more memory devices such as volatile memory (e.g., dynamic random access memory (DRAM), static random-access memory (SRAM)), non-volatile memory (e.g., read-only memory (ROM), flash memory, chalcogenide-based phase-change non-voltage memories), solid state memory, and/or a hard drive. In some embodiments, the memory 904 may include memory that is located on the same integrated circuit die as the processor unit 902. This memory may be used as cache memory (e.g., Level 1 (L1), Level 2 (L2), Level 3 (L3), Level 4 (L4), Last Level Cache (LLC)) and may include embedded dynamic random access memory (eDRAM) or spin transfer torque magnetic random access memory (STT-MRAM).

In some embodiments, the electrical device 900 can comprise one or more processor units 902 that are heterogeneous or asymmetric to another processor unit 902 in the electrical device 900. There can be a variety of differences between the processing units 902 in a system in terms of a spectrum of metrics of merit including architectural, micro-architectural, thermal, power consumption characteristics, and the like. These differences can effectively manifest themselves as asymmetry and heterogeneity among the processor units 902 in the electrical device 900.

In some embodiments, the electrical device 900 may include a communication component 912 (e.g., one or more communication components). For example, the communication component 912 can manage wireless communications for the transfer of data to and from the electrical device 900. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 912 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 912 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 912 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 912 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 912 may operate in accordance with other wireless protocols in other embodiments. The electrical device 900 may include an antenna 922 to facilitate wireless communications and/or to receive other wireless communications (such as AM or FM radio transmissions).

In some embodiments, the communication component 912 may manage wired communications, such as electrical, optical, or any other suitable communication protocols (e.g., IEEE 802.3 Ethernet standards). As noted above, the communication component 912 may include multiple communication components. For instance, a first communication component 912 may be dedicated to shorter-range wireless communications such as Wi-Fi or Bluetooth, and a second communication component 912 may be dedicated to longer-range wireless communications such as global positioning system (GPS), EDGE, GPRS, CDMA, WiMAX, LTE, EV-DO, or others. In some embodiments, a first communication component 912 may be dedicated to wireless communications, and a second communication component 912 may be dedicated to wired communications.

The electrical device 900 may include battery/power circuitry 914. The battery/power circuitry 914 may include one or more energy storage devices (e.g., batteries or capacitors) and/or circuitry for coupling components of the electrical device 900 to an energy source separate from the electrical device 900 (e.g., AC line power).

The electrical device 900 may include a display device 906 (or corresponding interface circuitry, as discussed above). The display device 906 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 900 may include an audio output device 908 (or corresponding interface circuitry, as discussed above). The audio output device 908 may include any embedded or wired or wirelessly connected external device that generates an audible indicator, such speakers, headsets, or earbuds.

The electrical device 900 may include an audio input device 924 (or corresponding interface circuitry, as discussed above). The audio input device 924 may include any embedded or wired or wirelessly connected device that generates a signal representative of a sound, such as microphones, microphone arrays, or digital instruments (e.g., instruments having a musical instrument digital interface (MIDI) output). The electrical device 900 may include a Global Navigation Satellite System (GNSS) device 918 (or corresponding interface circuitry, as discussed above), such as a Global Positioning System (GPS) device. The GNSS device 918 may be in communication with a satellite-based system and may determine a geolocation of the electrical device 900 based on information received from one or more GNSS satellites, as known in the art.

The electrical device 900 may include another output device 910 (or corresponding interface circuitry, as discussed above). Examples of the other output device 910 may include an audio codec, a video codec, a printer, a wired or wireless transmitter for providing information to other devices, or an additional storage device.

The electrical device 900 may include another input device 920 (or corresponding interface circuitry, as discussed above). Examples of the other input device 920 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 900 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra-mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 900 may be any other electronic device that processes data. In some embodiments, the electrical device 900 may comprise multiple discrete physical components. Given the range of devices that the electrical device 900 can be manifested as in various embodiments, in some embodiments, the electrical device 900 can be referred to as a computing device or a computing system.

Figure 10:
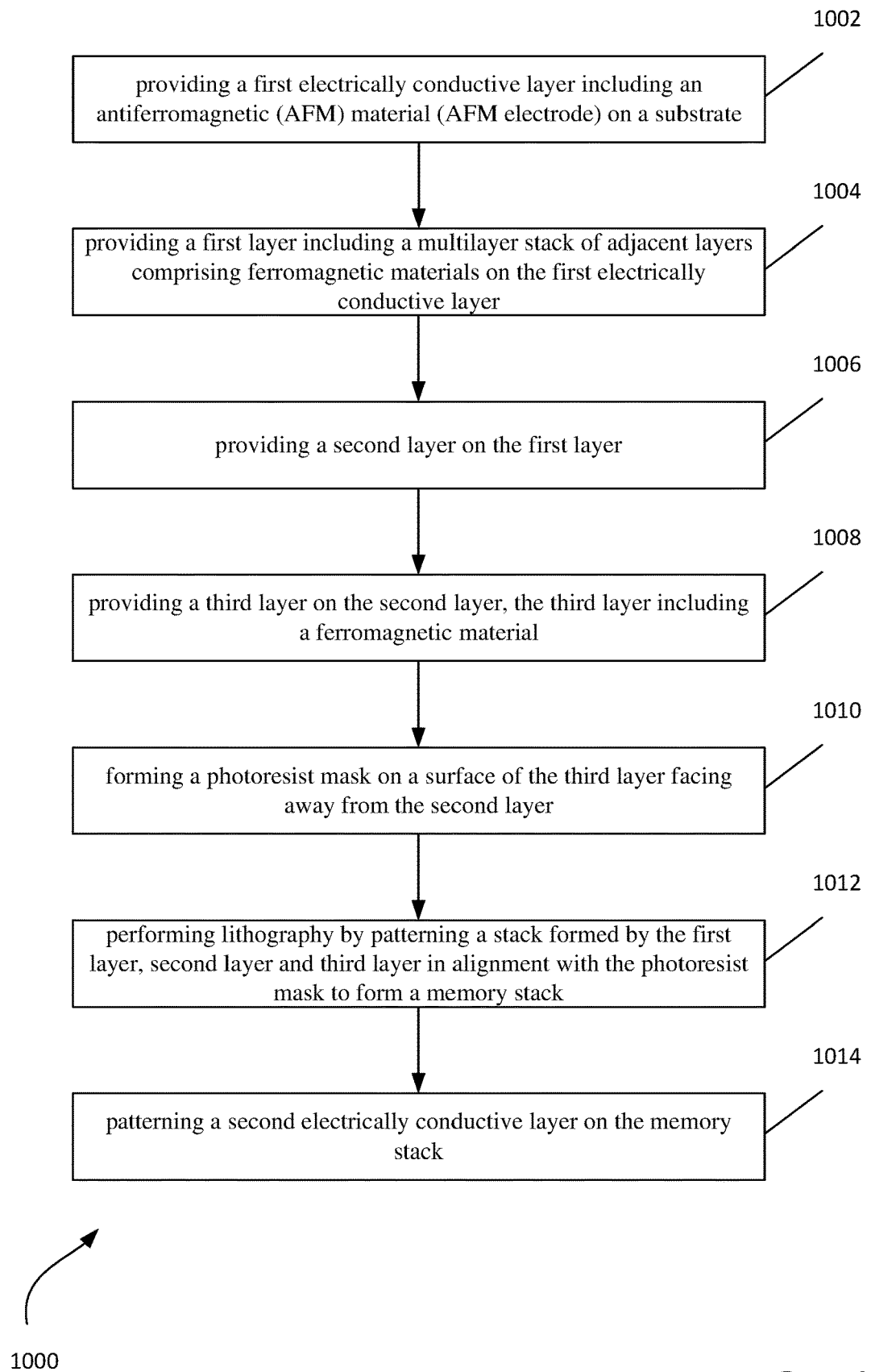
FIG. 10 is a flow chart of a process according to some embodiments.

FIG. 10 is a flow chart of a process 1000 according to some embodiments. At operation 1002, the process includes providing a first electrically conductive layer including an antiferromagnetic (AFM) material (AFM electrode) on a substrate; at operation 1004, the process includes providing a first layer including a multilayer stack of adjacent layers comprising ferromagnetic materials on the first electrically conductive layer. At operation 1006, the process includes providing a second layer on the first layer; at operation 1008, the process includes providing a third layer on the second layer, the third layer including a ferromagnetic material. At operation 1010, the process includes forming a photoresist mask on a surface of the third layer facing away from the second layer; at operation 1012, the process includes performing lithography by patterning a stack formed by the first layer, second layer and third layer in alignment with the photoresist mask to form a memory stack. At operation 1014, the process includes patterning a second electrically conductive layer on the memory stack.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of embodiments has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

In embodiments, the phrase "A is located on B" means that at least a part of A is in direct physical contact or indirect physical contact (having one or more other features between A and B) with at least a part of B.

In the instant description, "A is adjacent to B" means that at least part of A is in direct physical contact with at least a part of B.

In the instant description, "B is between A and C" means that at least part of B is in or along a space separating A and C and that the at least part of B is in direct or indirect physical contact with A and C.

In the instant description, "A is attached to B" means that at least part of A is mechanically attached to at least part of B, either directly or indirectly (having one or more other features between A and B).

In the instant description, "A comprises a material including B" means that at least part of A is made of a material that includes B, although A may comprise materials in addition to the material that includes B as well.

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," "according to some embodiments," "in accordance with embodiments," or "in embodiments," which may each refer to one or more of the same or different embodiments. Furthermore, the terms "comprising," "including," "having," and the like, as used with respect to embodiments of the present disclosure, are synonymous.

"Coupled" as used herein means that two or more elements are in direct physical contact, or that that two or more elements indirectly physically contact each other, but yet still cooperate or interact with each other (i.e. one or more other elements are coupled or connected between the elements that are said to be coupled with each other). The term "directly coupled" means that two or more elements are in direct contact.

As used herein, the term "module" refers to being part of, or including an ASIC, an electronic circuit, a system on a chip, a processor (shared, dedicated, or group), a solid state device, a memory (shared, dedicated, or group) that execute one or more software or firmware programs, a combinational logic circuit, and/or other suitable components that provide the described functionality.

As used herein, "electrically conductive" in some examples may refer to a property of a material having an electrical conductivity greater than or equal to $10^7$ Siemens per meter (S/m) at 20 degrees Celsius. Examples of such materials include Cu, Ag, Al, Au, W, Zn and Ni.

As used herein, an "integrated circuit component" may include one or more microelectronic dies.

In the corresponding drawings of the embodiments, signals, currents, electrical biases, or magnetic or electrical polarities may be represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, polarity, current, voltage, etc., as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the elements that are connected, without any intermediary devices. The term "coupled" means a direct or indirect connection, such as a direct electrical, mechanical, or magnetic connection between the elements that are connected or an indirect connection, through one or more passive or active intermediary devices. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about," generally refer to being within +/−10% of a target value (unless specifically specified). Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-- BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

EXAMPLES

Some non-limiting example embodiments are set forth below.

Example 1 includes a memory device including: a first electrode; a second electrode including an antiferromagnetic (AFM) material; and a memory stack including: a first layer adjacent the second electrode and including a multilayer stack of adjacent layers comprising ferromagnetic materials; a second layer adjacent the first layer; and a third layer adjacent the second layer at one side thereof, and adjacent the first electrode at another side thereof, the second layer between the first layer and the third layer, the third layer including a ferromagnetic material.

Example 2 includes the subject matter of Example 1, wherein the AFM material includes at least one of: Co; Fe; Ni; Mn and Ga; Mn, Ge, and Ga; Bct and Ru; MnGa, MnGeGa, or Bct-Ru; Ni, Ga, S and one of Mn, Fe, Co or Zn; Bi and Se; W and Te; W and Se; Mo and Se; Mn and one of Ir, Pt or Ni; or a triangular, Kagomi, chiral or hexagonal AFM material that is either in a single crystal form or in an amorphous alloy form.

Example 3 includes the subject matter of Example 1, wherein respective ones of adjacent layers of a pair of the adjacent layers of the multilayer stack include respective ferromagnetic materials.

Example 4 includes the subject matter of Example 3, wherein the adjacent layers of the multilayer stack include alternating layers of a first ferromagnetic material and a second ferromagnetic material different from the first ferromagnetic material.

Example 5 includes the subject matter of Example 4, wherein the adjacent layers of the multilayer stack include alternating adjacent layers of Co and Ni.

Example 6 includes the subject matter of Example 1, wherein: the first layer includes a layer comprising a high tunneling magnetoresistance (high TMR) material (high TMR free layer) including Co, X and Pt, wherein X=Cu, Ni, Mn or Cr, the high TMR free layer adjacent one side of the second layer; and the third layer includes a layer comprising a high TMR material (high TMR fixed layer), the high TMR fixed layer adjacent another side of the second layer opposite the one side of the second layer, wherein the high TMR material of the high TMR free layer includes Co, X and Pt, wherein X=Cu, Ni, Mn or Cr, and is one of identical to or different from the high TMR material of the high TMR fixed layer.

Example 7 includes the subject matter of Example 6, the high TMR material of any one of the high TMR free layer or the high TMR fixed layer including $Co_\alpha X_\beta Pt_\lambda$, wherein: X=Cu, Ni, Mn or Cr; $\alpha$ ranges from 20 to 50; $\beta$ ranges from 0 to 30; $\lambda$ ranges from 40 to 60; and $\alpha+\beta+\lambda=100$.

Example 8 includes the subject matter of Example 6, wherein the first layer includes a layer comprising at least one of Ru, Ir, W, or Ta between the multilayer stack and the high TMR free layer. Example 9 includes the subject matter of Example 1, wherein the second layer includes: Mg and O; Al and O; Eu and O; or an alloy including O and at least one of Mg, Al or Eu.

Example 10 includes the subject matter of Example 1, wherein the third layer includes a synthetic antiferromagnetic layer.

Example 11 includes the subject matter of Example 1, wherein the memory device corresponds to a magnetic tunnel junction (MTJ) magnetic random access memory (MRAM) memory device, and the memory stack includes a MTJ device.

Example 12 includes the subject matter of Example 11, wherein the first electrode corresponds to a first terminal of the memory device, the second electrode includes a second terminal of the memory device at one end thereof, and a third terminal of the memory device at another end thereof, the memory device corresponding to a spin orbit torque (SOT) memory device.

Example 13 includes the subject matter of Example 12, wherein the second electrode has a footprint that extends beyond a footprint of the MTJ device.

Example 14 includes the subject matter of Example 1, wherein the first electrode corresponds to a first terminal of the memory device, and the second electrode corresponds to a second terminal of the memory device, the memory device corresponding to a spin orbit torque (STT) memory device.

Example 15 includes the subject matter of Example 14, wherein the second electrode has a footprint that corresponds to a footprint of the MTJ device.

Example 16 includes the subject matter of Example 1, further including a metal-oxide-semiconductor field-effect transistor electrically connected to at least one of the first electrode or the second electrode.

Example 17 includes an integrated circuit component including: an array of memory devices, individual ones of the memory devices including: a first electrode; a second electrode including an antiferromagnetic (AFM) material; and a memory stack including: a first layer adjacent the second electrode and including a multilayer stack of adjacent layers comprising ferromagnetic materials; a second layer adjacent the first layer; and a third layer adjacent the second layer at one side thereof, and adjacent the first electrode at another side thereof, the second layer between the first layer and the third layer, the third layer including a ferromagnetic material; and one or more sense amplifiers connected to second electrodes of the array of memory devices.

Example 18 includes the subject matter of Example 17, wherein the AFM material includes at least one of: Co; Fe; Ni; Mn and Ga; Mn, Ge, and Ga; Bct and Ru; MnGa, MnGeGa, or Bct-Ru; Ni, Ga, S and one of Mn, Fe, Co or Zn; Bi and Se; W and Te; W and Se; Mo and Se; Mn and one of Ir, Pt or Ni; or a triangular, Kagomi, chiral or hexagonal AFM material that is either in a single crystal form or in an amorphous alloy form.

Example 19 includes the subject matter of Example 17, wherein respective ones of adjacent layers of a pair of the adjacent layers of the multilayer stack include respective ferromagnetic materials.

Example 20 includes the subject matter of Example 19, wherein the adjacent layers of the multilayer stack include alternating layers of a first ferromagnetic material and a second ferromagnetic material different from the first ferromagnetic material.

Example 21 includes the subject matter of Example 20, wherein the adjacent layers of the multilayer stack include alternating adjacent layers of Co and Ni.

Example 22 includes the subject matter of Example 17, wherein: the first layer includes a layer comprising a high tunneling magnetoresistance (high TMR) material (high TMR free layer) including Co, X and Pt, wherein X=Cu, Ni, Mn or Cr, the high TMR free layer adjacent one side of the second layer; and the third layer includes a layer comprising a high TMR material (high TMR fixed layer), the high TMR fixed layer adjacent another side of the second layer opposite the one side of the second layer, wherein the high TMR material of the high TMR free layer includes Co, X and Pt, wherein X=Cu, Ni, Mn or Cr, and is one of identical to or different from the high TMR material of the high TMR fixed layer.

Example 23 includes the subject matter of Example 22, the high TMR material of any one of the high TMR free layer or the high TMR fixed layer including $Co_\alpha X_\beta Pt_\lambda$, wherein: X=Cu, Ni, Mn or Cr; $\alpha$ ranges from 20 to 50; $\beta$ ranges from 0 to 30; $\lambda$ ranges from 40 to 60; and $\alpha+\beta+\lambda=100$.

Example 24 includes the subject matter of Example 22, wherein the first layer includes a layer comprising at least one of Ru, Ir, W, or Ta between the multilayer stack and the high TMR free layer.

Example 25 includes the subject matter of Example 17, wherein the second layer includes: Mg and O; Al and O; Eu and O; or an alloy including O and at least one of Mg, Al or Eu.

Example 26 includes the subject matter of Example 17, wherein the third layer includes a synthetic antiferromagnetic layer.

Example 27 includes the subject matter of Example 17, wherein the memory device corresponds to a magnetic tunnel junction (MTJ) magnetic random access memory (MRAM) memory device, and the memory stack includes a MTJ device.

Example 28 includes the subject matter of Example 27, wherein the first electrode corresponds to a first terminal of the memory device, the second electrode includes a second terminal of the memory device at one end thereof, and a third terminal of the memory device at another end thereof, the memory device corresponding to a spin orbit torque (SOT) memory device.

Example 29 includes the subject matter of Example 28, wherein the second electrode has a footprint that extends beyond a footprint of the MTJ device.

Example 30 includes the subject matter of Example 17, wherein the first electrode corresponds to a first terminal of the memory device, and the second electrode corresponds to a second terminal of the memory device, the memory device corresponding to a spin orbit torque (STT) memory device.

Example 31 includes the subject matter of Example 30, wherein the second electrode has a footprint that corresponds to a footprint of the MTJ device.

Example 32 includes the subject matter of Example 17, further including a metal-oxide-semiconductor field-effect transistor electrically connected to at least one of the first electrode or the second electrode.

Example 33 includes an integrated circuit device assembly including: a printed circuit board; and a plurality of integrated circuit components attached to the printed circuit board, at least one of the integrated circuit components including: an array of memory devices, individual ones of the memory devices including: a first electrode; a second electrode including an antiferromagnetic (AFM) material; and a memory stack including: a first layer adjacent the second electrode and including a multilayer stack of adjacent layers comprising ferromagnetic materials; a second layer adjacent the first layer; and a third layer adjacent the second layer at one side thereof, and adjacent the first electrode at another side thereof, the second layer between the first layer and the third layer, the third layer including a ferromagnetic material; and one or more sense amplifiers connected to second electrodes of the memory devices.

Example 34 includes the subject matter of Example 33, wherein the AFM material includes at least one of: Co; Fe; Ni; Mn and Ga; Mn, Ge, and Ga; Bct and Ru; MnGa, MnGeGa, or Bct-Ru; Ni, Ga, S and one of Mn, Fe, Co or Zn; Bi and Se; W and Te; W and Se; Mo and Se; Mn and one of Ir, Pt or Ni; or a triangular, Kagomi, chiral or hexagonal AFM material that is either in a single crystal form or in an amorphous alloy form.

Example 35 includes the subject matter of Example 33, wherein respective ones of adjacent layers of a pair of the adjacent layers of the multilayer stack include respective ferromagnetic materials.

Example 36 includes the subject matter of Example 35, wherein the adjacent layers of the multilayer stack include alternating layers of a first ferromagnetic material and a second ferromagnetic material different from the first ferromagnetic material.

Example 37 includes the subject matter of Example 36, wherein the adjacent layers of the multilayer stack include alternating adjacent layers of Co and Ni.

Example 38 includes the subject matter of Example 33, wherein: the first layer includes a layer comprising a high tunneling magnetoresistance (high TMR) material (high TMR free layer) including Co, X and Pt, wherein X=Cu, Ni, Mn or Cr, the high TMR free layer adjacent one side of the second layer; and the third layer includes a layer comprising a high TMR material (high TMR fixed layer), the high TMR fixed layer adjacent another side of the second layer opposite the one side of the second layer, wherein the high TMR material of the high TMR free layer includes Co, X and Pt, wherein X=Cu, Ni, Mn or Cr, and is one of identical to or different from the high TMR material of the high TMR fixed layer.

Example 39 includes the subject matter of Example 38, the high TMR material of any one of the high TMR free layer or the high TMR fixed layer including $Co_\alpha X_\beta Pt_\lambda$, wherein: X=Cu, Ni, Mn or Cr; $\alpha$ ranges from 20 to 50; $\beta$ ranges from 0 to 30; $\lambda$ ranges from 40 to 60; and $\alpha+\beta+\lambda=100$.

Example 40 includes the subject matter of Example 38, wherein the first layer includes a layer comprising at least one of Ru, Ir, W, or Ta between the multilayer stack and the high TMR free layer.

Example 41 includes the subject matter of Example 33, wherein the second layer includes: Mg and O; Al and O; Eu and O; or an alloy including O and at least one of Mg, Al or Eu.

Example 42 includes the subject matter of Example 33, wherein the third layer includes a synthetic antiferromagnetic layer.

Example 43 includes the subject matter of Example 33, wherein the memory device corresponds to a magnetic tunnel junction (MTJ) magnetic random access memory (MRAM) memory device, and the memory stack includes a MTJ device.

Example 44 includes the subject matter of Example 43, wherein the first electrode corresponds to a first terminal of the memory device, the second electrode includes a second terminal of the memory device at one end thereof, and a third terminal of the memory device at another end thereof, the memory device corresponding to a spin orbit torque (SOT) memory device.

Example 45 includes the subject matter of Example 44, wherein the second electrode has a footprint that extends beyond a footprint of the MTJ device.

Example 46 includes the subject matter of Example 33, wherein the first electrode corresponds to a first terminal of the memory device, and the second electrode corresponds to a second terminal of the memory device, the memory device corresponding to a spin orbit torque (STT) memory device.

Example 47 includes the subject matter of Example 46, wherein the second electrode has a footprint that corresponds to a footprint of the MTJ device.

Example 48 includes the subject matter of Example 33, further including a metal-oxide-semiconductor field-effect transistor electrically connected to at least one of the first electrode or the second electrode.

Example 49 includes a method to be performed at a memory device including a memory stack coupled between a first electrode and a second electrode, the method including: performing a write operation on the memory device including: determining an amplitude of a write current $I_w$ to be generated along the second electrode, $I_w$ based on a desired resistance of the memory stack, the desired resistance being one of more than two resistances programmable to the memory stack; causing the write current $I_w$ to flow along the second electrode to program the desired resistance to the memory stack; and performing a read operation on the memory device including; causing a read current to flow from the first electrode to the second electrode; and determining a resistance of the memory stack.

Example 50 includes the subject matter of Example 49, further including, during the read operation, controlling a read current of a subsequent memory device electrically coupled to the memory device by using the read current flowing from the first electrode to the second electrode.

Example 51 includes the subject matter of Example 49, further including controlling the read current flowing from the first electrode to the second electrode by using a read current from a prior memory device electrically coupled to the memory device.

What is claimed is:

1. A memory device including:
   a first electrode;
   a second electrode including an antiferromagnetic (AFM) material; and
   a memory stack including:
      a first layer adjacent the second electrode and including a multilayer stack of adjacent layers comprising ferromagnetic materials;
      a second layer adjacent the first layer; and
      a third layer adjacent the second layer at one side thereof, and adjacent the first electrode at another side thereof, the second layer between the first layer and the third layer, the third layer including a ferromagnetic material, wherein:
         the first layer includes a layer comprising a high tunneling magnetoresistance (high TMR) material (high TMR free layer) including Co, X and Pt, wherein X=Cu, Ni, Mn or Cr, the high TMR free layer adjacent one side of the second layer; and
         the third layer includes a layer comprising a high TMR material (high TMR fixed layer), the high TMR fixed layer adjacent another side of the second layer opposite the one side of the second layer, wherein the high TMR material of the high TMR free layer includes Co, X and Pt, wherein X=Cu, Ni, Mn or Cr, and is one of identical to or different from the high TMR material of the high TMR fixed layer.

2. The memory device of claim 1, wherein the AFM material includes at least one of:
   Co;
   Fe;
   Ni;
   Mn and Ga;
   Mn, Ge, and Ga;
   Bct and Ru;
   MnGa, MnGeGa, or Bct-Ru;
   Ni, Ga, S and one of Mn, Fe, Co or Zn;
   Bi and Se;
   W and Te;
   W and Se;
   Mo and Se;
   Mn and one of Ir, Pt or Ni; or
   a triangular, Kagomi, chiral or hexagonal AFM material that is either in a single crystal form or in an amorphous alloy form.

3. The memory device of claim 1, wherein respective ones of adjacent layers of a pair of the adjacent layers of the multilayer stack include respective ferromagnetic materials.

4. The memory device of claim 3, wherein the adjacent layers of the multilayer stack include alternating layers of a first ferromagnetic material and a second ferromagnetic material different from the first ferromagnetic material.

5. The memory device of claim 4, wherein the adjacent layers of the multilayer stack include alternating adjacent layers of Co and Ni.

6. The memory device of claim 1, the high TMR material of any one of the high TMR free layer or the high TMR fixed layer including $Co_\alpha X_\beta Pt_\lambda$, wherein:
   X=Cu, Ni, Mn or Cr;
   $\alpha$ ranges from 20 to 50;
   $\beta$ ranges from 0 to 30;
   $\lambda$ ranges from 40 to 60; and
   $\alpha+\beta+\lambda=100$.

7. The memory device of claim 1, wherein the first layer includes a layer comprising at least one of Ru, Ir, W, or Ta between the multilayer stack and the high TMR free layer.

8. The memory device of claim 1, wherein the second layer includes:
   Mg and O;
   Al and O;
   Eu and O; or
   an alloy including O and at least one of Mg, Al or Eu.

9. The memory device of claim 1, wherein the memory device corresponds to a magnetic tunnel junction (MTJ) magnetic random access memory (MRAM) memory device, and the memory stack includes a MTJ device.

10. The memory device of claim 9, wherein the first electrode corresponds to a first terminal of the memory device, the second electrode includes a second terminal of the memory device at one end thereof, and a third terminal of the memory device at another end thereof, the memory device corresponding to a spin orbit torque (SOT) memory device.

11. The memory device of claim 9, wherein the first electrode corresponds to a first terminal of the memory device, and the second electrode corresponds to a second terminal of the memory device, the memory device corresponding to a spin orbit torque (STT) memory device.

12. The memory device of claim 1, further including a metal-oxide-semiconductor field-effect transistor electrically connected to at least one of the first electrode or the second electrode.

13. An integrated circuit component including:
   an array of memory devices, individual ones of the memory devices including:
      a first electrode;
      a second electrode including an antiferromagnetic (AFM) material; and
      a memory stack including:
         a first layer adjacent the second electrode and including a multilayer stack of adjacent layers comprising ferromagnetic materials;
         a second layer adjacent the first layer; and
         a third layer adjacent the second layer at one side thereof, and adjacent the first electrode at another side thereof, the second layer between the first layer and the third layer, the third layer including a ferromagnetic material, wherein:

the first layer includes a layer comprising a high tunneling magnetoresistance (high TMR) material (high TMR free layer) including Co, X and Pt, wherein X=Cu, Ni, Mn or Cr, the high TMR free layer adjacent one side of the second layer, the first layer further including a layer comprising at least one of W, or Ta between the multilayer stack and the high TMR free layer; and the third layer includes a layer comprising a high TMR material (high TMR fixed layer), the high TMR fixed layer adjacent another side of the second layer opposite the one side of the second layer, wherein the high TMR material of the high TMR free layer includes Co, X and Pt, wherein X=Cu, Ni, Mn or Cr, and is one of identical to or different from the high TMR material of the high TMR fixed layer; and one or more sense amplifiers connected to second electrodes of the array of memory devices.

14. The integrated circuit component of claim 13, wherein the AFM material includes at least one of:
Co;
Fe;
Ni;
Mn and Ga;
Mn, Ge, and Ga;
Bct and Ru;
MnGa, MnGeGa, or Bct-Ru;
Ni, Ga, S and one of Mn, Fe, Co or Zn;
Bi and Se;
W and Te;
W and Se;
Mo and Se;
Mn and one of Ir, Pt or Ni; or
a triangular, Kagomi, chiral or hexagonal AFM material that is either in a single crystal form or in an amorphous alloy form.

15. The integrated circuit component of claim 13, wherein the adjacent layers of the multilayer stack include alternating adjacent layers of Co and Ni.

16. The integrated circuit component of claim 13, wherein the second layer includes:
Mg and O;
Al and O;
Eu and O; or
an alloy including O and at least one of Mg, Al or Eu.

17. The integrated circuit component of claim 13, wherein the memory device corresponds to a magnetic tunnel junction (MTJ) magnetic random access memory (MRAM) memory device, and the memory stack includes a MTJ device.

18. The integrated circuit component of claim 17, wherein the first electrode corresponds to a first terminal of the memory device, the second electrode includes a second terminal of the memory device at one end thereof, and a third terminal of the memory device at another end thereof, the memory device corresponding to a spin orbit torque (SOT) memory device.

19. The integrated circuit component of claim 17, wherein the first electrode corresponds to a first terminal of the memory device, and the second electrode corresponds to a second terminal of the memory device, the memory device corresponding to a spin orbit torque (STT) memory device.

20. An integrated circuit device assembly including:
a printed circuit board; and
a plurality of integrated circuit components attached to the printed circuit board, at least one of the integrated circuit components including:
an array of memory devices, individual ones of the memory devices including:
a first electrode;
a second electrode including an antiferromagnetic (AFM) material; and
a memory stack including:
a first layer adjacent the second electrode and including a multilayer stack of adjacent layers comprising ferromagnetic materials;
a second layer adjacent the first layer; and
a third layer adjacent the second layer at one side thereof, and adjacent the first electrode at another side thereof, the second layer between the first layer and the third layer, the third layer including a ferromagnetic material, wherein:
the first layer includes a layer comprising a high tunneling magnetoresistance (high TMR) material (high TMR free layer) including Co, X and Pt, wherein X=Cu, Ni, Mn or Cr, the high TMR free layer adjacent one side of the second layer, the first layer further including a layer comprising at least one of W, or Ta between the multilayer stack and the high TMR free layer; and
the third layer includes a layer comprising a high TMR material (high TMR fixed layer), the high TMR fixed layer adjacent another side of the second layer opposite the one side of the second layer, wherein the high TMR material of the high TMR free layer includes Co, X and Pt, wherein X=Cu, Ni, Mn or Cr, and is one of identical to or different from the high TMR material of the high TMR fixed layer; and
one or more sense amplifiers connected to second electrodes of the memory devices.

21. The integrated circuit device assembly of claim 20, wherein the AFM material includes at least one of:
Co;
Fe;
Ni;
Mn and Ga;
Mn, Ge, and Ga;
Bct and Ru;
MnGa, MnGeGa, or Bct-Ru;
Ni, Ga, S and one of Mn, Fe, Co or Zn;
Bi and Se;
W and Te;
W and Se;
Mo and Se;
Mn and one of Ir, Pt or Ni; or
a triangular, Kagomi, chiral or hexagonal AFM material that is either in a single crystal form or in an amorphous alloy form.

22. The integrated circuit device assembly of claim 20, wherein the adjacent layers of the multilayer stack include alternating adjacent layers of Co and Ni.

23. The integrated circuit device assembly of claim 20, wherein the second layer includes:
Mg and O;
Al and O;
Eu and O; or
an alloy including O and at least one of Mg, Al or Eu.

* * * * *